Sept. 12, 1967     L. J. PIANOWSKI     3,341,191
WORK RACK DEVICE
Filed June 15, 1965                                2 Sheets-Sheet 1
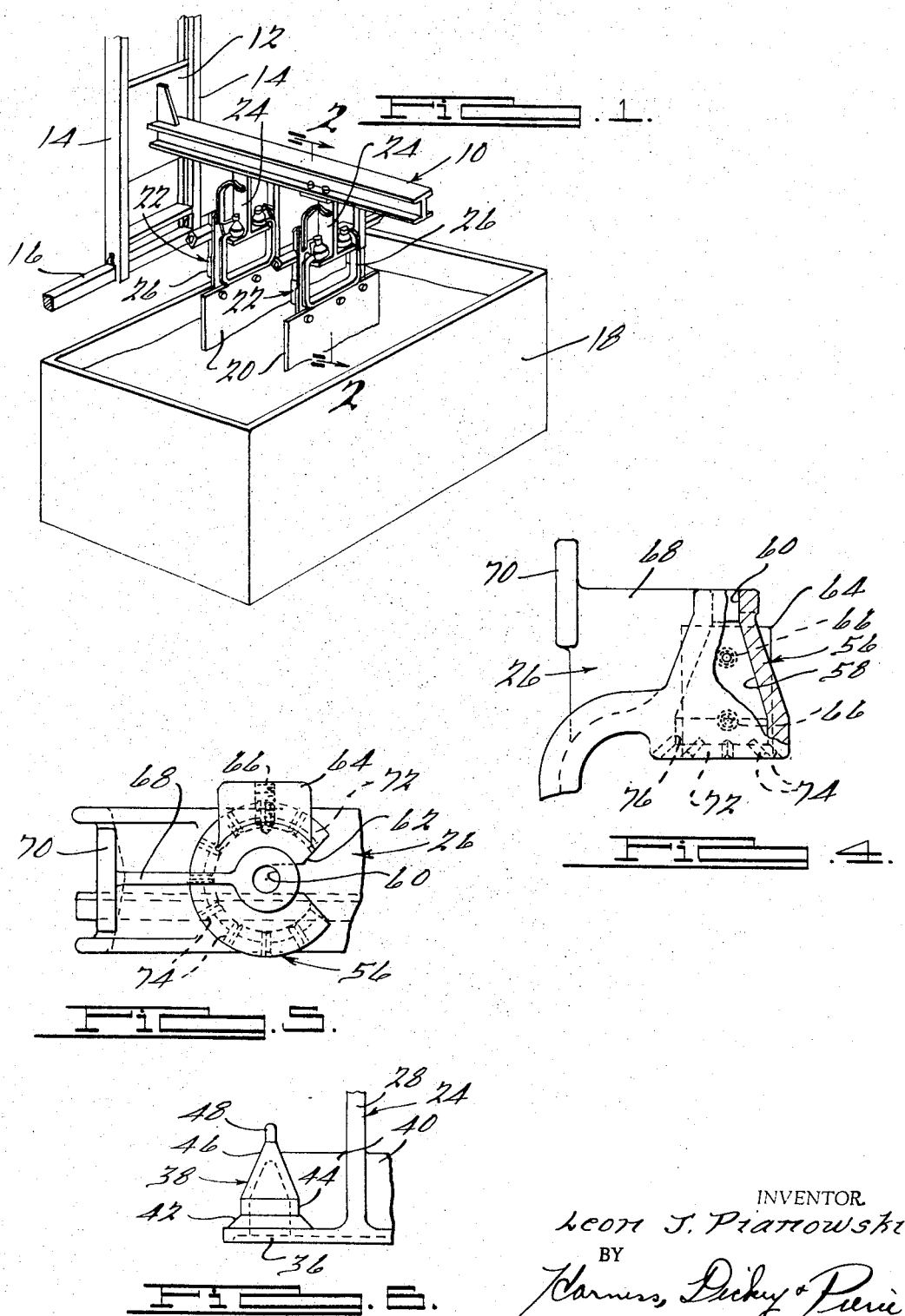
INVENTOR.
Leon J. Pianowski
BY
Harness, Dickey & Pierce
ATTORNEYS

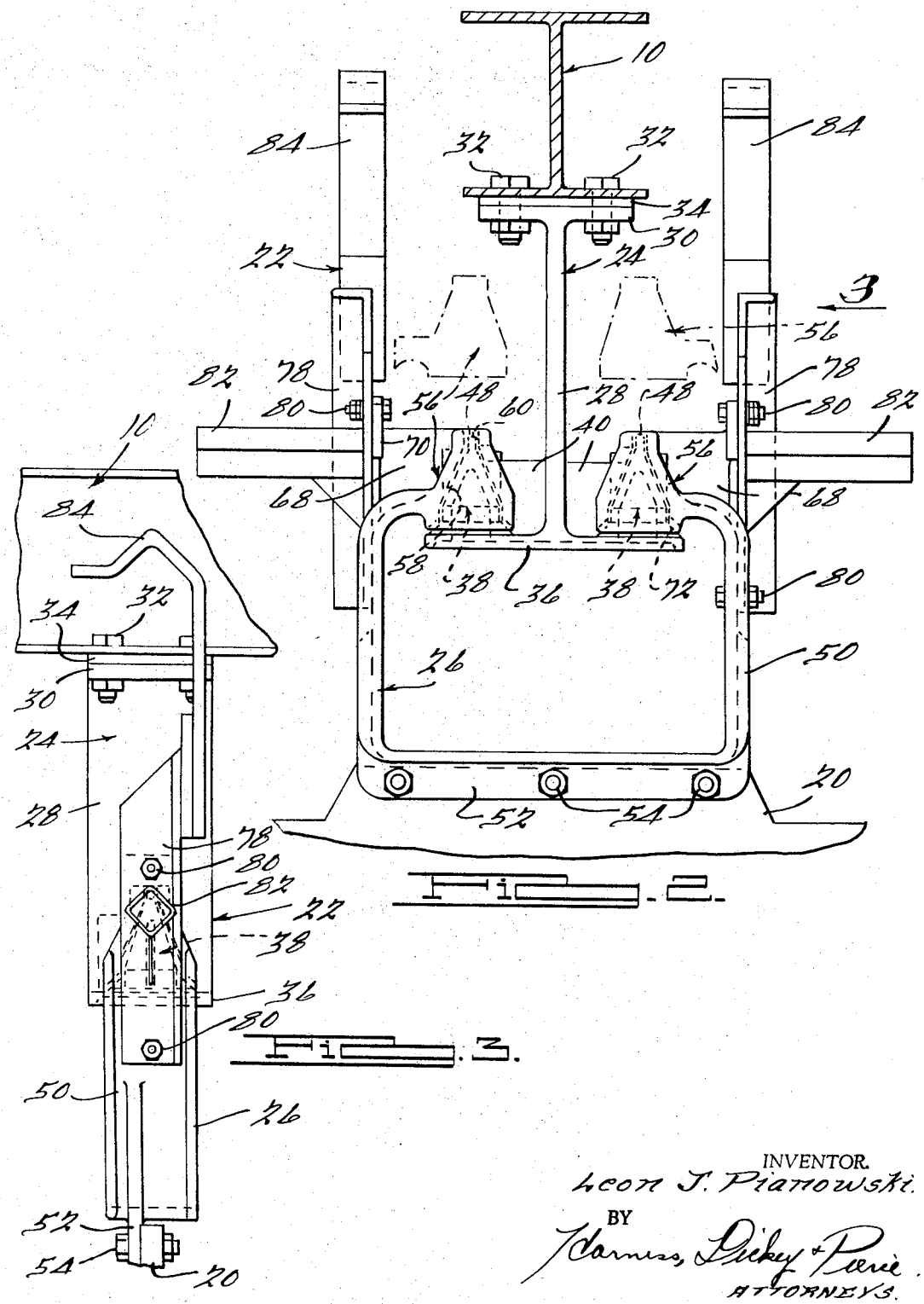

United States Patent Office 3,341,191
Patented Sept. 12, 1967

3,341,191
WORK RACK DEVICE
Leon J. Pianowski, Detroit, Mich., assignor to The Udylite Corporation, Warren, Mich., a corporation of Delaware
Filed June 15, 1965, Ser. No. 464,059
7 Claims. (Cl. 269—321)

The present invention broadly relates to materials-handling equipment, and more particularly to a novel work carrier assembly for use in conveying apparatus for removably supporting work racks which are transferred automatically from one work operation to another work operation. More specifically, the present invention is directed to a work carrier assembly of the type adapted to be mounted on conveying machines for transferring work racks automatically through a sequentially phased treating sequence such as an electroplating operation, for example.

The use of conveying machines for sequentially conveying workpieces through a preselected sequentially phased treating cycle is in widespread commercial use. Various methods have heretofore been used or proposed for use for supporting the workpieces or the work racks containing the workpieces on the conveying machine facilitating the transfer thereof from one treating station to the next adjoining treating station. Conventionally, the work racks are suspended from a work carrier or a movable supporting framework which is mounted for movement in a horizontal path through the treating stations and additionally are provided with means for periodically elevating the work racks in order that they can be transferred above intervening obstructions such as the partitions separating adjoining treating receptacles. In many instances, the work carriers to which the work racks are attached are movably supported directly on a supporting rail which may be electrified, as desired, to supply electric current to the workpiece as required in an electroplating operation. In other instances, the work carriers and work racks suspended therefrom are movably mounted on a movable supporting member such as a work-supporting arm which in turn is operative to convey the work carriers and work racks through the treating stations.

In either event, the work carriers heretofore used or proposed for use have been found deficient in many respects due to the inability thereof of maintaining the work racks in a substantially fixed position while immersed in an agitated liquid treating tank, and means proposed to overcome this problem have seriously detracted from the ease of loading and unloading the work racks on the conveying machine. In many liquid treating operations such as electroplating operations, for example, the solution is subjected to a high degree of agitation which imposes forces on the work racks and workpieces supported thereon, tending to cause the work racks to swing or otherwise move from their intended central location in a tank. Such movement is frequently undesirable, particularly when employing nested anodes which are strategically located in the solution so as to provide a controlled metallic deposit on the surfaces of the workpieces being processed. In such an instance, the variation in the spacing of the workpieces from such anodes produces discrepancies in the uniformity of treatment obtained. When the anodes, for example, are spaced relatively closely to the work rack to be immersed therein during the descending movement of the work rack, it has been found in many instances that the agitated solution is effective to cause a deflection of the path of entry of the work rack to an extent sufficient to cause physical interference therebetween, which in some instances has caused damage to the workpieces being treated or to the equipment, necessitating a shutdown of the operation of the machine.

The problem of providing a work carrier which is effective to prevent undesired movement of the work rack suspended therfrom has been aggravated by the increasing use of automatic machinery for loading and unloading the work racks on a conveying machine. When such automatic loading and unloading equipment is employed, it is necessary that the work rack can be simply placed on and removed from the conveying machine without any additional mechanical operations to effect an uncoupling thereof. It is also necessary to provide latitude in the alignment between the work rack and the conveying machine so as to provide a positive loading and unloading of the work racks in spite of slight misalignment between the conveying machine and the loading-unloading mechanism employed.

It is accordingly a primary object of the present invention to provide an improved work carrier assembly which fulfills a heretofore long-felt need and overcomes the problems and disadvantages associated with work carriers of the types heretofore known.

Another object of the present invention is to provide an improved work carrier assembly which is particularly adaptable to automatic loading and unloading equipment, assuring a positive engagement by the loading mechanism and incorporating self-aligning means therein assuring proper engagement and disengagement of the work carrier with the supporting member.

Still another object of the present invention is to provide an improved work carrier which incorporates self-aligning engaging means thereon which is operative to prevent undesirable movement of the work carrier and work racks suspended therefrom relative to the supporting member on which it is mounted.

A further object of the present invention is to provide an improved work carrier assembly including self-aligning engaging means thereon which further provides for a positive electrical contact between the work carrier and the supporting structure as is required at treating stations at which electrification of workpieces is required.

A still further object of the present invention is to provide an improved work carrier assembly which is of simple design, of durable construction, and of versatile use and operation.

The foregoing and other objects and advantages of the present invention are achieved by providing a work carrier assembly including two members, one of which is adapted to be mounted on a supporting member of the conveying machine and the other of which is adapted to be removably suspended therefrom. Coacting means are provided on the supporting member and the removable member comprising a plurality of spaced engaging means each consisting of a tapered projection formed with a plurality of substantially cylindrical surfaces disposed at longitudinally spaced intervals along the longitudinal axis of the projection and an engaging element of a cup-shaped configuration formed with a cavity therein having a shape complementary to the shape of the periphery of the projection which is adapted to slidably receive the projection in a manner such that the coaction of the contacting surfaces therebetween is operative to restrain tilting movement of the axes of the projection and cup-shaped element relative to each other, thereby preventing unwanted movement of the work rack suspended therefrom. It is contemplated in accordance with the present invention that the work carrier assembly can be composed of an electrically conductive material such as copper, bronze, aluminum, or the like, whereupon electrification of one member effects the corresponding electrification of the other member at selected treating stations whereupon the workpieces on the work rack are appropriately electrified for providing the appropriate treatment.

Other objects and advantages of the present invention will become apparent upon a reading of the following description taken in conjunction with the accompanying drawings, wherein:

FIGURE 1 is a fragmentary perspective view of a typical conveying apparatus provided with two work carrier assemblies constructed in accordance with the preferred embodiments of the present invention;

FIGURE 2 is a magnified transverse vertical sectional view taken through the supporting arm of the conveying machine as shown in FIGURE 1 and taken along the line 2—2 thereof;

FIGURE 3 is a side elevational view of the work carrier assembly as shown in FIGURE 2 and as viewed in the direction of the arrow indicated at 3 thereof;

FIGURE 4 is a fragmentary enlarged side elevational view partly in section of the cup-shaped engaging member formed on one of the two members comprising the work carrier assembly;

FIGURE 5 is a fragmentary plan view of the engaging member as shown in FIGURE 4; and FIGURE 6 is an enlarged fragmentary side elevational view of a projection on the other member comprising the work carrier assembly adapted to mutally coact with the engaging member as shown in FIGURES 4 and 5.

Referring now in detail to the drawings, and as may be best seen in FIGURE 1, a conveying machine is fragmentarily illustrated which is illustrative of one of the many types to which the work carrier assembly comprising the present invention is applicable. In the exemplary embodiment of the conveying machine as shown in FIGURE 1, a work-supporting arm 10 is rigidly connected at one end thereof to a plate 12 which is adapted to be disposed in vertical sliding relationship between two vertical guide members 14. The guide members 14 in turn are movably supported such as on a supporting rail 16 for horizontal movement from one treating station to the next adjacent treating station. Suitable elevating means are provided for selectively raising the plate 12 and the work-supporting arm 10 thereon in order that the workpieces and work racks suspended from the supporting arm can be moved from a lowered position, as shown in FIGURE 1, to a raised position in which the work racks are withdrawn from the treating solution.

In the exemplary arrangement as illustrated in FIGURE 1, the work-supporting arm 10 is shown in the lowered position above a treating station including a treating tank 18 which is filled with an appropriate treating solution. Two laterally spaced work racks 20 are suspended from the supporting arm 10 by means of work carrier assemblies generally indicated at 22. The work carrier assemblies 22 include a first member 24 affixed to the underside of the work-supporting arm 10 and a second member 26 removably mounted on and engaged with the first member 24 to the lower end of which the work racks 20 are connected. The work carrier assemblies 22, as will be subsequently described in detail, include mutually engageable means thereon which prevents a lateral and longitudinal tilting of the second member relative to the first member, thereby preventing unwanted movement of the work racks while suspended in the treating solutions or during entry or withdrawal thereof.

The first member 24 of the work carrier assembly 22, as may be best seen in FIGURES 2, 3 and 6, comprises a central web 28 formed with a flange 30 at the upper end thereof which is adapted to be securely fastened to the lower surface of the work-supporting arm 10 such as by means of bolts 32. The first member 24 is mounted in intimate electrical contact against a contactor indicated at 34 which extends longitudinally of the work-supporting arm to which electric current is supplied in accordance with any of the methods well known in the art. A lower flange 36 is secured to the lower end portion of the web 28 and projects laterally to each side thereof. A pair of projections 38 are mounted on the lower flange 36 in spaced relationship and project upwardly therefrom, as is best seen in FIGURES 2 and 6. Additional reinforcement of the lower flange 36 and the projections 38 thereon is provided by a pair of transverse webs 40 extending from each side of the web 28 and affixed to the inner surface of the projections 38. In accordance with the preferred practice of the present invention, the entire first member 24 is composed of an electrically conductive metal which is integrally cast in the configuration as shown, assuring the necessary strength and rigidity of the member as well as good electrical current transmission therethrough.

Each of the projections 38, as best seen in FIGURE 6, is of a conical tapered configuration including a conical base portion 42, a substantially cylindrical portion 44 disposed immediately adjacent to and concentric with the base portion 42, an intermediate conical portion 46 disposed adjacent to and concentric with the cylindrical portion 44 which terminates at the upper end thereof with a substantially cylindrical extension indicated at 48. As will be noted in FIGURE 6, the substantially cylindrical portion 44 and the extension 48 are longitudinally spaced relative to each other along the axis of the projection for the purposes to be subsequently described.

The second or lower member 26 of the work-carrier assembly 22 comprises a generally U-shaped frame 50 formed with a depending flange 52 along the lower horizontal leg thereof to which a work rack such as the work rack 20 is removably secured such as by means of bolts 54. To the upper inwardly extending legs of the U-shaped frame 50, a pair of cup-shaped engaging elements 56 are integrally secured which are formed with downwardly directed cavities 58 having a shape complementary to the shape of teh periphery of the projections 38. The upper end of the engaging elements 56, as may be best seen in FIGURE 4, is preferably formed with an aperture 60 through which the extension 48 at the upper end of the projection 38 extends. As best seen in FIGURE 5, a segment of the periphery of each of the engaging elements 56 adapted to be positioned adjacent to the transverse webs 40 are slotted as at 62 so as to provide clearance and avoid any mechanical conflict when the lower member 26 is disposed in engaged relationship and suspended from the first member 24. It will be appreciated that when no transverse reinforcing web 40 is incorporated on the first member 24 the slot 62 in the engaging elements 56 can be omitted.

In accordance with a preferred embodiment of the present invention, each of the engaging elements 56 is provided with a pad 64 integrally formed therewith incorporating a pair of threaded bores 66, as best seen in FIGURES 4 and 5, providing therewith a mounting surface on which supplementary contact means can be mounted such as, for example, contacts for an auxiliary anode incorporated in the work rack. In such latter event, appropriate contact means are provided at a station for supplying electrical current to a cable which in turn is supported on the mounting pad 64 effecting electrical energization of the anodes incorporated in the work rack in order to achieve an appropriate deposition of a metal plating on the surfaces of articles which may be of an irregular contour. In addition, the engaging elements 56 may be further rigidified by means of webs 68 affixed to the outer edges thereof and extending laterally therefrom, as may be best seen in FIGURE 4, and having their lower edges integrally connected to the leg portions of the U-shaped frame 50. The outer and upper edges of the web 68 may be provided with a mounting pad 70 for the purposes to be described subsequently.

As hereinbefore set forth, the cavity 58 in each of the engaging elements 56 is of a shape complementary to the shape of the periphery of the projection 38. Accordingly, the engaging element is provided with a conical base section 72 which, when the second member is supported by the first member, is disposed in bearing contact against the conical base portion 42 of the projection 38 in a manner as best seen in FIGURES 2 and 3. In accordance with a preferred practice of the present invention, the conical base section 72 of the engaging element is formed with a plurality of circumferentially spaced radially extending grooves or slots 74, which in the specific embodiment shown are of a V-shaped cross section. The provision of the grooves 74 on the conical base section serves to provide a drainage passage from the interior of the engaging element enabling drainage of any solution or other extraneous matter which may inadvertently become entrapped therein. The pressure contact between the conical base section 72 and the conical base portion 42 provides an intimate path for conduction of the electrical current transmitted to the upper member 24 to the lower member 26 and in turn to the rack and workpieces suspended therefrom.

The general upwardly tapered configuration of each of the projections 38 and the corresponding configuration of the cavities 58 of the engaging elements provides self-alignment of the upper and lower members when the lower member is deposited in suspended relationship on the upper member. In addition, the coaction between the longitudinally spaced cylindrical portion 44 and cylindrical extension 48 on the projection with a corresponding substantially cylindrical section 76 adjacent to the base section 72 and the aperture 60 in the upper end thereof, respectively, provides a locking arrangement which prevents or restrains tilting movement of the engaging member relative to the projection. As may be best seen in FIGURE 2, any tendency of the lower member 26 to tilt in either direction relative to the upper member 24 causes contact and coaction between the side surfaces of the extension 48 on the projection and the inner surface of the apertures 60 on the engaging member as well as the cylindrical surface 44 on the projection with the cylindrical surface 76 on the engaging member imposing a torque which resists the tilting movement. Accordingly, the work rack 20 is maintained in a substantially rigid position by means of the interlocking relationship of the projections and engaging members, in spite of side forces imposed thereon by the rapidly circulating solution in a treating tank during the treatment thereof as well as during the immersion or withdrawal of the work rack. This interlocking relationship is achieved without any necessity of accurately finishing the mating surfaces such as by machining or grinding, for example, and unfinished castings have been found to provide exceptionally satisfactory results and complete interchangeability between the first members 24 and successively deposited second members 26. The weight of the work rack 20 and of the lower member 26 is more than sufficient to maintain proper engagement between the engaging members and projections in spite of nonuniform lifting forces exerted by the circulating solution to one side of the rack which is resisted by the couple created by contact of the interlocking surfaces.

It will be understood that equally satisfactory results are attained by a reversal of the projections 38 and engaging elements 56; that is, it is contemplated that the projection can be affixed to the lower member 26 and extend downwardly therefrom to be slidably received in the engaging elements 56 connected to the upper member 24 disposed with the cavities thereof positioned in an upward direction. This latter relationship is best illustrated by a viewing of FIGURE 2 in an inverted position.

In order to facilitate the automatic handling of the lower member 26 and the work rack 20 connected thereon by automatic transfer or loading-unloading mechanisms, for example, the lower member 26 may additionally incorporate suitable side projections for engagement by the loading mechanism as well as engaging means for depositing the work rack on a suitable conveyor rail, or the like. In accordance with a preferred embodiment of the present invention, the engaging arms and hooks are preferably formed of a prefabricated assembly and are subsequently bolted or otherwise secured to the lower member 26, substantially simplifying the casting of the work-carrier components. As may best be seen in FIGURES 1, 2 and 3, the auxiliary lifting devices comprise a side member 78 comprising an angle iron which is securely fastened at its upper end to the mounting pad 70 and at its lower end to the upright side of the U-shaped frame 50 by means such as bolts 80. An arm 82 of a tubular square-shaped cross section is rigidly affixed to each of the side members 78 and projects laterally therefrom as best seen in FIGURE 2. The arms 82 are adapted to be engaged by suitable lift means (not shown) of an automatic loading device of various types well known in the art which is operative to lift the lower member 26 and the work rack 20 suspended therefrom from a suspended engaged position, as shown in solid lines in FIGURE 2, to an elevated disengaged position as shown in phatom. As will be noted, when in the raised position the engaging elements 56 can be withdrawn laterally and parallel to the longitudinal axis of the supporting arm without any mechanical interference. Similarly, double loader and unloader mechanisms can be employed which are operative to simultaneously remove or deposit two work racks such as in a dual rack machine, as typically illustrated in FIGURE 1.

It is also desirable, in many instances, during the storage of the work rack preparatory to its treating cycle or during the further transportation thereof to additional work operations at the completion of its treating cycle, to provide means for depositing the rack on a monorail such as a shop conveyor. For this purpose, a pair of hooks, indicated at 84 in FIGURES 2 and 3, are secured to the upper end portions of the side members 78. Alternative supplementary engaging means can similarly be provided consistent with the materials-handling equipment employed for loading-unloading and transporting the work racks automatically between stations.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A work carrier assembly comprising two members, one of which is removably suspended from the other by a plurality of spaced engaging means, each said engaging means comprising a tapered projection formed on one of said members and provided with a plurality of substantially cylindrical surfaces disposed at spaced intervals along the longitudinal axis thereof, and an engaging element formed with a cavity therein having a shape complementary to the shape of the periphery of said projection for slidably receiving said projection and restraining tilting movement of the axis of said projection relative to the axis of said engaging element, and means on the one of said members suspended from the other of said members for mounting workpieces thereon.

2. A work carrier assembly comprising two members of an electrically conductive material, one of which is removably suspended from the other by a plurality of spaced engaging means, each said engaging means comprising a tapered projection formed on one of said members and provided with a plurality of substantially cylindrical and concentric surfaces disposed at spaced intervals along the longitudinal axis thereof, and an engaging element formed with a cavity therein having a shape complementary to the shape of the periphery of said projection for slidably receiving said projection and restraining tilting movement of the axis of said projection relative to the axis of said engaging element, and means on the one of said members suspended from the other of said members for mounting workpieces thereon.

3. A work carrier assembly comprising two members removably connected in suspended relationship by engaging means, said engaging means including a plurality of tapered projections mounted in spaced relationship on one of said members and a plurality of engaging elements disposed in spaced relationship on the other of said members each formed with a cavity therein of a shape complementary to the peripheral shape of each said projection for receiving and slidably engaging said projection, each of said projections formed with a plurality of substantially cylindrical surfaces longitudinally spaced along the axes thereof for contact with corresponding surfaces in each of said cavities for restraining tilting movement of the longitudinal axes of said projecitons relative to the longitudinal axes of said cavities, and means on the one of said members suspended from the other of said members for mounting workpieces thereon.

4. A work carrier assembly for electroplating operations comprising two members of an electrically conductive material removably connected in suspended relationship by engaging means, said engaging means including a plurality of tapered projections mounted in spaced relationship on one of said members and a plurality of engaging elements disposed in spaced relationship on the other of said members each formed with a cavity therein of a shape complementary to the peripheral shape of each said projection for receiving and slidably engaging said projections, each of said projections formed with a plurality of substantially cylindrical concentric surfaces disposed in spaced longitudinal relationship along the longitudinal axis thereof for contact with corresponding surfaces in each of said cavities for restraining tilting movement of the longitudinal axes of said projections relative to the longitudinal axes of said cavities, and means on the one of said members suspended from the other of said members for mounting workpieces thereon.

5. A work carrier assembly comprising two members removably connected in suspended relationship by engaging means, said engaging means including a plurality of tapered projections mounted in spaced relationship on one of said members, and a plurality of engaging elements disposed in spaced relationship on the other of said members each formed with a cavity therein of a shape complementary to the peripheral shape of each said projections for receiving and slidably engaging said projections, each of said projections formed with a plurality substantially cylindrical surfaces disposed in longitudinally spaced relationship along the longitudinal axis thereof for contact with corresponding surfaces in each of said cavities for restraining tilting movement of the longitudinal axes of said projections relative to the longitudinal axes of said cavities, each of said projections further formed with a conical surface adapted to be disposed in bearing contact with a complementary conical surface in each said cavity providing intimate electrical contact between said members, and means on the one of said members suspended from the other of said members for mounting work carriers thereon.

6. A work carrier assembly comprising a first member and a second member removably supported on said first member, said first member comprising a frame including a pair of transversely spaced upright projections thereon, and means for attaching said frame to a supporting member, each of said projections comprising a conical base portion, a substantially cylindrical portion adjacent to and concentric with said base portion, a conical intermediate portion adjacent to and concentric with said cylindrical portion and terminating at its upper end in a substantially cylindrical top portion, said second member comprising a framework including a pair of transversely spaced engaging elements each formed with a downwardly directed cavity of a shape complementary to the peripheral shape of each of said projections for receiving and engaging said projections and removably suspending said second member on said first member, and means on said second member for suspending workpieces thereon.

7. A work carrier comprising a first member and a second member composed of an electrically conductive material removably supported on said first member, said first member comprising a frame including a pair of transversely spaced upright projections thereon, and means for attaching said frame to a supporting member, each said projection comprising a conical base portion, a substantially cylindrical portion adjacent to and substantially concentric with said base portion, a conical intermediate portion adjacent to and substantially concentric with said cylindrical portion and terminating at its upper end in a substantially cylindrical top portion, said second member comprising a framework including a pair of transversely spaced engaging elements each formed with a downwardly directed cavity of a shape complementary to the peripheral shape of each of said projections for receiving and engaging said projections and removably suspending said second member on said first member, said cavity including a conical surface adapted to be disposed in bearing contact against said conical base portion of said projection, a plurality of circumferentially spaced radially extending slots formed in said conical surface, means on said framework for suspending workpieces thereon, and supporting means on said second member engageable with lift means for removing and depositing said second member on said first member.

References Cited

UNITED STATES PATENTS

| | | | |
|---|---|---|---|
| 2,478,292 | 8/1949 | Lofgren | 248—224 X |
| 2,760,929 | 8/1956 | Shepard | 204—297 X |
| 3,275,544 | 9/1966 | Gade | 204—297 |
| 3,306,652 | 2/1967 | Harper | 294—82 |

ROBERT C. RIORDON, *Primary Examiner.*

J. F. McKEOWN, *Assistant Examiner.*